(12) United States Patent
Ishikawa et al.

(10) Patent No.: US 8,092,947 B1
(45) Date of Patent: Jan. 10, 2012

(54) FUEL CELL SYSTEM

(75) Inventors: Tomotaka Ishikawa, Toyota (JP); Hiromi Tanaka, Toyota (JP); Osamu Yumita, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/259,962

(22) PCT Filed: Jun. 19, 2009

(86) PCT No.: PCT/JP2009/061222
§ 371 (c)(1),
(2), (4) Date: Sep. 23, 2011

(87) PCT Pub. No.: WO2010/146712
PCT Pub. Date: Dec. 23, 2010

(51) Int. Cl.
*H01M 8/04* (2006.01)
*H01M 8/10* (2006.01)

(52) U.S. Cl. .......... 429/431; 429/432

(58) Field of Classification Search .......... None
See application file for complete search history.

(56) References Cited

U.S. PATENT DOCUMENTS

| | | | |
|---|---|---|---|
| 2007/0111076 A1* | 5/2007 | Endoh | 429/33 |
| 2009/0117450 A1* | 5/2009 | Iisaka | 429/42 |

FOREIGN PATENT DOCUMENTS

| | | | |
|---|---|---|---|
| JP | 2004-030979 A | | 1/2004 |
| JP | 2005-044668 A | | 2/2005 |
| JP | 2008-034253 A | | 2/2008 |
| JP | 2008-198439 A | | 8/2008 |
| JP | 2009-170313 A | | 7/2009 |
| JP | 2009-205967 A | | 9/2009 |

OTHER PUBLICATIONS

International Search Report mailed Mar. 23, 2010 of PCT/JP2009/061222.

* cited by examiner

*Primary Examiner* — John S Maples
(74) *Attorney, Agent, or Firm* — Kenyon & Kenyon LLP

(57) ABSTRACT

Provided is a fuel cell system that performs a warm-up operation by reducing a supply of oxidant gas to a fuel cell, the system having: a fuel cell; and a control unit that regulates amounts of oxidant gas and fuel gas supplied to the fuel cell and controls a power-generation state of the fuel cell. During the warm-up operation with a reduced supply of oxidant gas to the fuel cell, the control unit varies a voltage of the fuel cell for a short period of time to obtain current-voltage characteristics which indicate a relationship of an output voltage and an output current of the fuel cell, calculates an effective catalyst area of the fuel cell based on the obtained current-voltage characteristics, and determines whether the warm-up operation of the fuel cell can be stopped or not based on the calculated effective catalyst area.

3 Claims, 6 Drawing Sheets

US 8,092,947 B1

FUEL CELL SYSTEM

CROSS REFERENCE TO RELATED APPLICATION

This is a 371 national phase application of PCT/JP2009/061222 filed Jun. 19, 2009, the content of which is incorporated herein by reference in its entirety.

TECHNICAL FIELD

The present invention relates to a fuel cell system which performs, when it is started at a temperature below zero, a warm-up operation by reducing a supply of oxidant gas to a fuel cell.

BACKGROUND ART

Among fuel cells generating electric power utilizing an electrochemical reaction between hydrogen and oxygen, polymer electrolyte fuel cells are known. A polymer electrolyte fuel cell of this type has a stack which is constituted by a plurality of stacked cells. Each cell constituting the stack has an anode (fuel electrode) and a cathode (air electrode), and a solid polymer electrolyte membrane having a sulfonic acid group as an ion exchange group is disposed between the anode and the cathode.

A fuel gas (hydrogen-enriched reformed hydrogen obtained by reforming hydrogen gas or hydrocarbon) is supplied to the anode, while an oxidant gas (e.g., air) that contains oxygen as an oxidant is supplied to the cathode. Upon the supply of the fuel gas to the anode, hydrogen contained in the fuel gas reacts with a catalyst in a catalyst layer of the anode, resulting in the generation of hydrogen ions. The generated hydrogen ions pass through the solid polymer electrolyte membrane and electrically react with oxygen in the cathode. Through this electrochemical reaction, electric power is generated.

In a fuel cell system that utilizes a polymer electrolyte fuel cell as a power source, if the system stops the operation, the temperature of the fuel cell decreases, and the water within the fuel cell, which has been in hot and humid conditions until then, would condense to form dew drops, or freeze. In particular, when the temperature of the fuel cell is below zero, the water generated through the power-generation reaction freezes on the surface of the electrode, which would interfere with the supply of oxygen and inhibit the power-generation reaction.

So, when starting the system at a temperature below zero, a warm-up operation is performed in which an amount of oxidant gas supplied to the fuel cell is reduced to increase an amount of heat generation (see Patent Document 1 below). Also, in order to reduce problems that would occur when the fuel cell has a negative voltage with insufficient hydrogen gas during such a warm-up operation, a fuel cell system as described in Patent Document 2 below has been proposed.

In the technique described in Patent Document 2, a fuel cell system is controlled using a flowchart illustrated in FIG. 2 of the document. According to the flowchart in FIG. 2 of Patent Document 2, a warm-up operation is performed if the fuel cell is at a temperature of 0° C. or lower, and stopped if the temperature goes above 0° C.

PRIOR ART REFERENCES

Patent Documents

Patent Document 1: Japanese laid-open patent publication No. 2004-30979

Patent Document 2: Japanese laid-open patent publication No. 2008-198439

SUMMARY OF THE INVENTION

Problem to be Solved by the Invention

A fuel cell (fuel cell stack) has a large heat capacity, and it takes time to warm up all portions of the fuel cell (fuel cell stack). Also, even if the portion for which the temperature was measured has a temperature exceeding 0° C., the possibility that ice remains in a gas flow path and causes clogging there cannot be ignored, and in view of this, it would not always be appropriate to stop a warm-up operation simply based on the fact that the temperature of the fuel cell is above 0° C.

The present invention has been made considering the problems described above, and an object of the invention is to provide a fuel cell system that performs, when it is started at a temperature below zero, a warm-up operation by reducing a supply of oxidant gas to a fuel cell, the system being capable of accurately finding whether a gas flow path is in a clogged state or not so that the start and stop of the warm-up operation can be appropriately judged.

Means for Solving the Problem

In order to achieve the above object, the invention provides a fuel cell system that performs a warm-up operation by reducing an amount of oxidant gas supplied to a fuel cell, the system having: a fuel cell; and a control unit that regulates amounts of oxidant gas and fuel gas supplied to the fuel cell and controls a power-generation state of the fuel cell, wherein, during the warm-up operation with a reduced supply of oxidant gas to the fuel cell, the control unit varies a voltage of the fuel cell for a short period of time to obtain current-voltage characteristics which indicate a relationship of an output voltage and an output current of the fuel cell, and wherein the control unit calculates an effective catalyst area of the fuel cell based on the obtained current-voltage characteristics and determines whether the warm-up operation of the fuel cell can be stopped or not based on the calculated effective catalyst area.

According to the invention, while a warm-up operation is being performed by reducing an amount of oxidant gas supplied to the fuel cell, the voltage of the fuel cell is varied for a short period of time; in other words, a current sweep is performed for the fuel cell for a short period of time. When performing a current sweep for the fuel cell for a short period of time, an output current increases together with a decrease of voltage because an oxide coating peels off the catalyst, but after that, the output current decreases due to the oxidation of the catalyst, and by increasing the voltage thereafter, the fuel cell returns to the voltage-current relationship at the point it originated. Since the thus obtained current-voltage characteristics are almost the same as the cyclic voltammetry (CV) curve of the unit cell constituting the fuel cell, an area corresponding to an area of oxidation current in the CV curve can be obtained from the obtained current-voltage characteristics, and the effective catalyst area can consequently be obtained. Accordingly, in this invention, the effective catalyst area of the fuel cell is calculated by varying the voltage of the fuel cell for a short period of time, and the calculated effective catalyst area is used to accurately determine whether the gas flow path of the fuel cell is clogged or not, thereby determining whether the warm-up operation of the fuel cell can be stopped or not.

In the fuel cell system according to the invention, it is preferable that the control unit determines, based on the calculated effective catalyst area, whether circulation in an anode circulation system is allowed or not, the anode circulation system being a system for supplying a fuel gas to the fuel cell in a circulating manner. Since whether the gas flow path of the fuel cell is clogged or not can accurately be determined by calculating the effective catalyst area, the circulation in the anode circulation system can be stopped when the flow path in the anode circulation system is considered to be frozen. It is considered that the clogging in the gas flow path of the fuel cell is due to freezing, and thus, further clogging can be suppressed by stopping the circulation in the anode circulation system in the above manner.

In the fuel cell system according to the invention, it is also preferable that the control unit determines, based on the calculated effective catalyst area, whether circulation in a cooling system for the fuel cell is allowed or not. Even in the case where the circulation in the cooling system is stopped to perform the warm-up operation more efficiently, since whether the gas flow path of the fuel cell is clogged or not can accurately be determined by calculating the effective catalyst area, the circulation in the cooling system can be started if the effective catalyst area becomes equal to or greater than a predetermined value.

Effect of the Invention

The invention can provide a fuel cell system that can accurately find whether a gas flow path is in a clogged state or not and can thus appropriately judge the start and stop of a warm-up operation.

MODE FOR CARRYING OUT THE INVENTION

Figure 1:
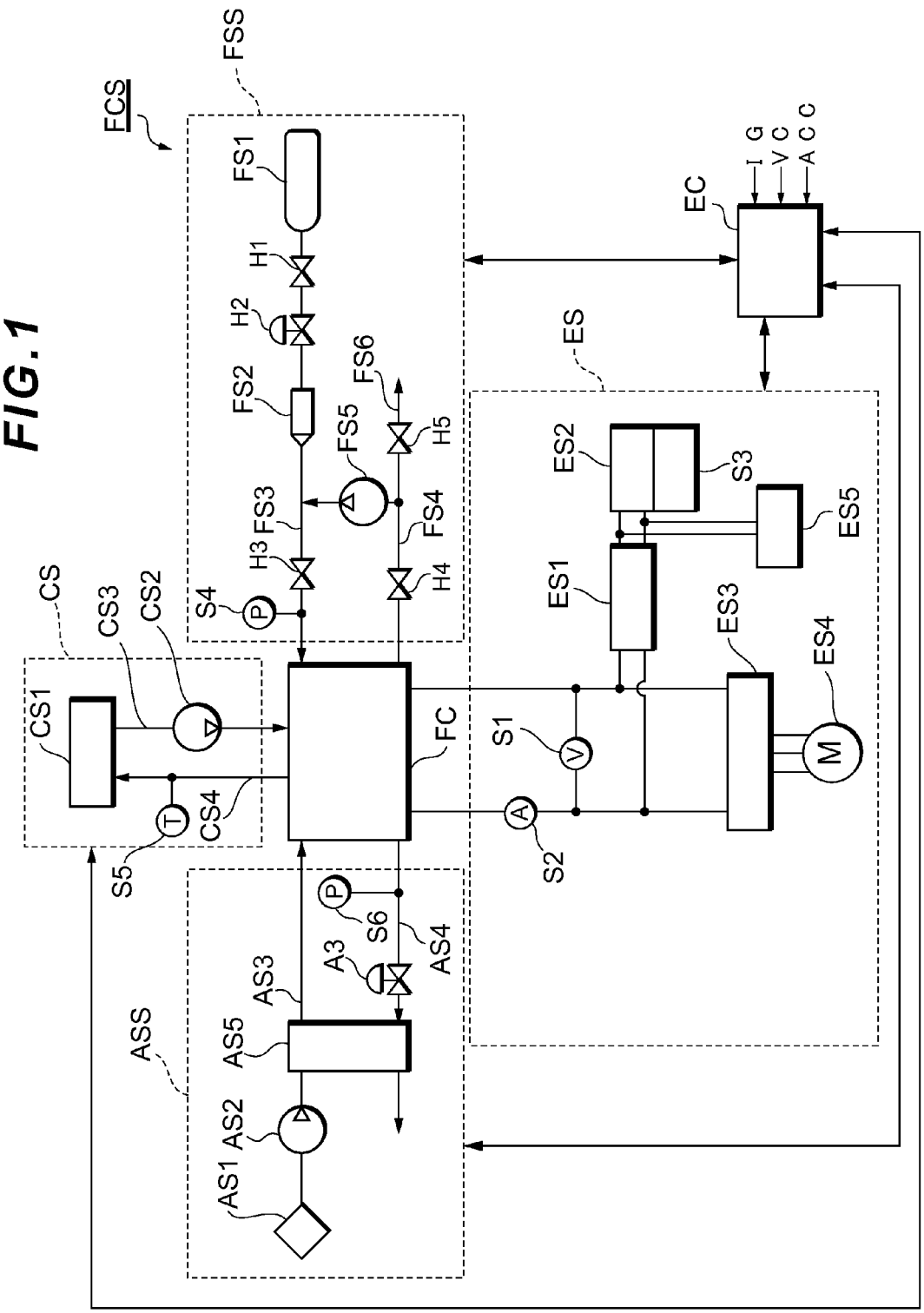
FIG. 1 is a diagram illustrating the configuration of a fuel cell system to be installed in a fuel cell vehicle according to an embodiment of the invention.

Embodiments of the invention will be described below with reference to the attached drawings. In order that the description can easily be understood, the same components are given the same reference numerals to the extent possible in the respective drawings, and any repetitive description will be omitted.

First, a fuel cell system FCS to be installed in a fuel cell vehicle according to an embodiment of the invention will be described with reference to FIG. 1. FIG. 1 is a diagram showing the system configuration of a fuel cell system FCS that functions as an on-vehicle power source system of a fuel cell vehicle. The fuel cell system FCS can be installed in vehicles such as fuel cell cars (FCHV), electric cars or hybrid cars.

The fuel cell system FCS has: a fuel cell FC; an oxidant gas supply system ASS; a fuel gas supply system FSS (anode circulation system); an electric power system ES; a cooling system CS; and a controller EC. The fuel cell FC receives the supply of reactant gases (fuel gas, oxidant gas) and generates electric power. The oxidant gas supply system ASS is a system for supplying air as an oxidant gas to the fuel cell FC. The fuel gas supply system FSS is a system for supplying hydrogen gas as a fuel gas to the fuel cell FC. The electric power system ES is a system for controlling electric power charge/discharge. The cooling system CS is a system for cooling the fuel cell FC. The controller EC is a controller for the overall control of the entire fuel cell system FCS.

The fuel cell FC is structured as a solid polymer electrolyte type cell stack formed of a number of cells (each unit cell having (as a power generator) an anode, a cathode and electrolyte) stacked in series. In the fuel cell FC under a normal operation, the oxidation reaction shown by formula (1) occurs in the anode and the reduction reaction shown by formula (2) occurs in the cathode, and in the fuel cell FC as a whole, the electrogenic reaction shown by formula (3) occurs.

$$H_2 \rightarrow 2H^+ + 2e^- \tag{1}$$

$$(\tfrac{1}{2})O_2 + 2H^+ + 2e^- \rightarrow H_2O \tag{2}$$

$$H_2 + (\tfrac{1}{2})O_2 \rightarrow H_2O \tag{3}$$

The oxidant gas supply system ASS has an oxidant gas flow path AS3 and an oxidant-off gas flow path AS4. The oxidant gas flow path AS3 is a flow path through which the oxidant gas to be supplied to the cathode of the fuel cell FC flows. The oxidant-off gas flow path AS4 is a flow path through which the oxidant-off gas discharged from the fuel cell FC flows.

The oxidant gas flow path AS3 is provided with an air compressor AS2 and a humidifier AS5. The air compressor AS2 is a compressor for introducing the oxidant gas from the atmosphere through a filter AS1. The humidifier AS5 is a device for humidifying the oxidant gas compressed by the air compressor AS2.

The oxidant-off gas flow path AS4 is provided with a pressure sensor S6, a back pressure regulating valve A3 and the humidifier AS5. The back pressure regulating valve A3 is a valve for regulating the oxidant gas supply pressure. The humidifier AS5 is provided as a device for exchanging moisture between the oxidant gas (dry gas) and the oxidant-off gas (wet gas).

The fuel gas supply system FSS has a fuel gas supply source FS1, a fuel gas flow path FS3, a circulation flow path FS4, a circulation pump FS5 and an exhaust/drain flow path FS6. The fuel gas flow path FS3 is a flow path through which the fuel gas to be supplied from the fuel gas supply source FS1 to the anode of the fuel cell FC flows. The circulation flow path FS4 is a flow path for returning the fuel-off gas discharged from the fuel cell FC back to the fuel gas flow path FS3. The circulation pump FS5 pumps the fuel-off gas within the circulation flow path FS4 into the fuel gas flow path FS3. The exhaust/drain flow path FS6 is a flow path connected to and branching from the circulation flow path FS4.

The fuel gas supply source FS1 is constituted by, for example, a high-pressure hydrogen tank or a hydrogen absorbing alloy, and stores hydrogen gas at a high pressure (e.g., 35 MPa to 70 MPa). When a cutoff valve H1 is opened, the fuel gas flows to the fuel gas flow path FS3 from the fuel gas supply source FS1. The pressure of the fuel gas is reduced, for example, to approximately 200 kPa by a regulator H2 or an injector FS2, and the resultant gas is supplied to the fuel cell FC.

The fuel gas flow path FS3 is provided with the cutoff valve H1, the regulator H2, the injector FS2, a cutoff valve H3, and a pressure sensor S4. The cutoff valve H1 is a valve for blocking or allowing the fuel gas supply from the fuel gas supply source FS1. The regulator H2 is provided for regulating the pressure of fuel gas. The injector FS2 is provided for controlling the amount of fuel gas supplied to the fuel cell FC. The cutoff valve H3 is a valve for blocking the fuel gas supply to the fuel cell FC.

The regulator H2 is a device for regulating the pressure on the upstream side (primary pressure) to a preset secondary pressure, and is constituted by, for example, a mechanical pressure reducing valve for reducing the primary pressure. The mechanical pressure reducing valve has a casing in which a backpressure chamber and a pressure regulating chamber are formed while being separated by a diaphragm, and has a configuration in which, with the backpressure in the backpressure chamber, the primary pressure is reduced to a predetermined pressure in the pressure regulating chamber, thereby obtaining the secondary pressure. By arranging the regulator H2 on the upstream side of the injector FS2, the upstream-side pressure of the injector FS2 can effectively be reduced.

The injector FS2 is an electromagnetic drive type on-off valve having a configuration in which a valve body is directly driven by an electromagnetic driving force with a predetermined drive period so as to be separated from a valve seat, thereby controlling a gas flow rate or a gas pressure. The injector FS2 is provided with: a valve seat having an injection hole through which gaseous fuel such as fuel gas is injected; a nozzle body for supplying and guiding the gaseous fuel to the injection hole; and a valve body held so as to be contained in a manner such that the valve body is moveable in an axial direction (gas flow direction) with respect to the nozzle body, for opening and closing the injection hole.

The valve body of the injector FS2 is driven by a solenoid, which is an electromagnetic drive, and is configured such that control signals that are output from the controller EC can control a gas injection duration and a gas injection time of the injector FS2. In order to supply gas to the downstream thereof at a required flow rate, the injector FS2 changes at least one of the opening area (degree of opening) and the opening period of time of the valve body, which is provided in a gas flow path of the injector FS2, thereby adjusting the flow rate (or hydrogen mol concentration) of the gas supplied to the downstream side.

The circulation flow path FS4 is provided with a cutoff valve H4, and is connected to the exhaust/drain flow path FS6. The exhaust/drain flow path FS6 has an exhaust/drain valve H5, which is operated under the control of the controller EC to discharge the impurity-containing fuel-off gas and water within the circulation flow path FS4 to the outside. By opening the exhaust/drain valve H5, the concentration of impurities in the fuel-off gas in the circulation flow path FS4 is reduced, and the hydrogen concentration in the fuel-off gas flowing through the circulation system can consequently be increased.

The fuel-off gas discharged via the exhaust/drain valve H5 is mixed with the oxidant-off gas flowing in the oxidant-off gas flow path AS4, and diluted by a diluter (not shown in the drawing). Upon being driven by a motor, the circulation pump FS5 supplies the fuel-off gas in the circulation system to the fuel cell FC in a circulating manner.

The electric power system ES has a DC/DC converter ES1, a battery ES2, a traction inverter ES3, a traction motor ES4 and auxiliary devices ES5. The fuel cell system FCS is structured as a parallel hybrid system in which the DC/DC converter ES1 and the traction inverter ES3 are each parallel-connected to the fuel cell FC.

The DC/DC converter ES1 has a function of increasing a direct current voltage supplied from the battery ES2 and outputting it to the traction inverter ES3, and also has a function of decreasing the voltage of a direct current power generated by the fuel cell FC or the voltage of a regenerative power collected by the traction motor ES4 through regenerative braking and charging the battery ES2 with the resulting power. With the above functions of the DC/DC converter ES1, the charging and discharging of the battery ES2 is controlled. Also, with the voltage conversion control by the DC/DC converter ES1, the operation point (output terminal voltage, output current) of the fuel cell FC is controlled. A voltage sensor S1 and a current sensor S2 are attached to the fuel cell FC. The voltage sensor S1 detects an output terminal voltage of the fuel cell FC. The current sensor S2 detects an output current of the fuel cell FC.

The battery ES2 functions as: a source in which surplus electric power is to be stored; a source in which regenerative energy is to be stored during regenerative braking; and an energy buffer to be used when the load varies as a result of acceleration or deceleration of the fuel cell vehicle. A secondary battery, such as a nickel/cadmium battery, a nickel/hydrogen battery, or a lithium secondary battery, is preferably used for the battery ES2. An SOC sensor S3 for detecting an SOC (state of charge) is attached to the battery ES2.

The traction inverter ES3 is, for example, a PWM inverter driven by a pulse-width modulation system. In response to control commands from the controller EC, the traction inverter ES3 converts a direct current voltage output from the fuel cell FC or from the battery ES2 into a three-phase alternating current voltage, thereby controlling the rotation torque of the traction motor ES4. The traction motor ES4 is, for example, a three-phase AC motor, and constitutes a power source of the fuel cell vehicle.

The term "auxiliary devices ES5" is used as a generic term referring to various motors disposed in each portion of the fuel cell system FCS (for example, power sources for pumps, etc.), inverters for driving such motors, and various on-board auxiliary units (for example, an air compressor, injector, coolant water circulation pump, radiator, etc.).

The cooling system CS has a radiator CS1, a coolant pump CS2, a coolant inflow path CS3 and a coolant outflow path CS4. The radiator CS1 cools a coolant for cooling the fuel cell FC by radiating the heat of the coolant. The coolant pump CS2 is a pump for flowing the coolant back and forth between the fuel cell FC and the radiator CS1. The coolant inflow path CS3 is a flow path connecting the radiator CS1 and the fuel cell FC, and is provided with the coolant pump CS2. When the coolant pump CS2 is driven, the coolant flows from the radiator CS1 into the fuel cell FC through the coolant inflow path CS3. The coolant outflow path CS4 is a flow path connecting the fuel cell FC and the radiator CS1, and is provided with a water temperature sensor S5. When the coolant pump CS2 is driven, the coolant that has been used to cool down the fuel cell FC flows back to the radiator CS1.

The controller EC (control unit) is a computer system which is provided with a CPU, ROM, RAM and an input/output interface, and controls the respective portions of the fuel cell system FCS. For example, when the controller EC receives an ignition signal IG output from an ignition switch, it starts the operation of the fuel cell system FCS. After that, the controller EC determines the required electric power in the entire fuel cell system FCS based on, for example, an acceleration-opening-degree signal ACC output from an acceleration sensor and a vehicle speed signal VC output from a speed sensor. The required electric power in the entire fuel cell system FCS corresponds to the sum of the electric power for running the vehicle and the electric power for auxiliary devices.

The above-mentioned electric power for auxiliary devices includes: power consumed by on-board auxiliary units (a humidifier, air compressor, hydrogen pump, coolant water circulation pump, etc.); power consumed by devices necessary for running the vehicle (a speed change gear, wheel controller, steering device, suspension, etc.); and power consumed by devices arranged in a passenger space (an air conditioner, lighting device, audio system, etc.).

The controller EC determines what portions of the power are to be output from the fuel cell FC and from the battery ES2, respectively. The controller EC controls the oxidant gas supply system ASS and the fuel gas supply system FSS so that the power generated by the fuel cell FC corresponds to a target power, and it also controls the DC/DC converter ES1 to control the operation point (output terminal voltage, output current) of the fuel cell FC. Furthermore, in order to attain a target torque depending on the degree of opening of the accelerator, the controller EC outputs to the traction inverter ES3, alternating current voltage command values for the respective U, V and W phases as switching commands, thereby controlling the output torque and the number of rotations of the traction motor ES4. Moreover, the controller EC controls the cooling system CS so that the fuel cell FC is at a suitable temperature.

Figure 2:
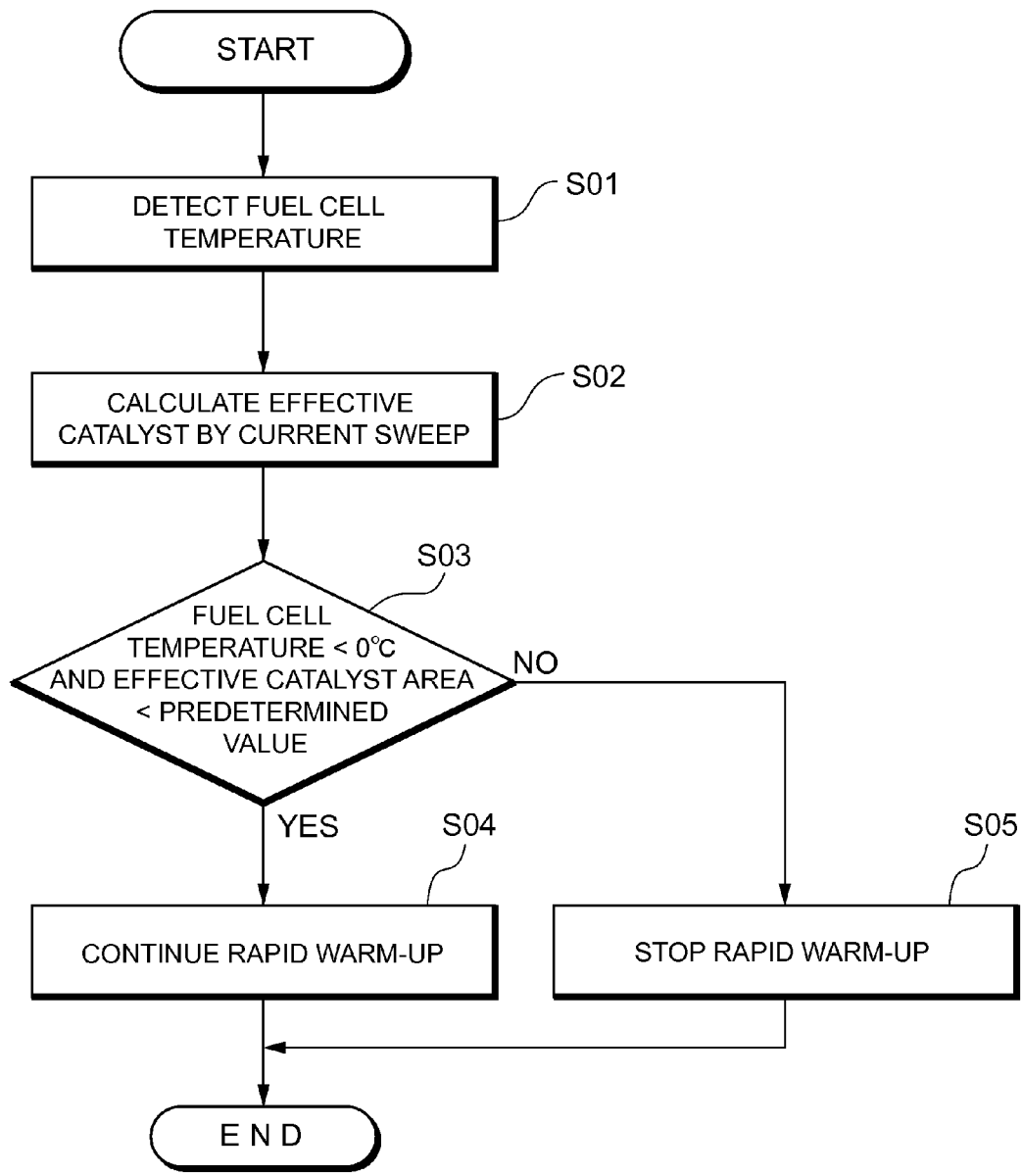
FIG. 2 is a flowchart for determining whether a warm-up operation is allowed to be stopped or not in the fuel cell system shown in FIG. 1.

Next, how the fuel cell system FCS of this embodiment determines whether a rapid warm-up operation should be continued or not will be described with reference to FIG. 2. FIG. 2 is a flowchart for determining whether a rapid warm-up operation should be continued or not. In this embodiment, the "rapid warm-up operation" means a low-efficiency operation performed with a reduced output terminal voltage by decreasing the amount of air supply through the drive of the air compressor AS2.

In step S01, the temperature of the fuel cell FC is detected. This detection of the fuel cell FC temperature is carried out by a temperature sensor (not shown in the drawing) provided in the fuel cell FC, and the detected temperature is output to the controller EC.

Figure 3:
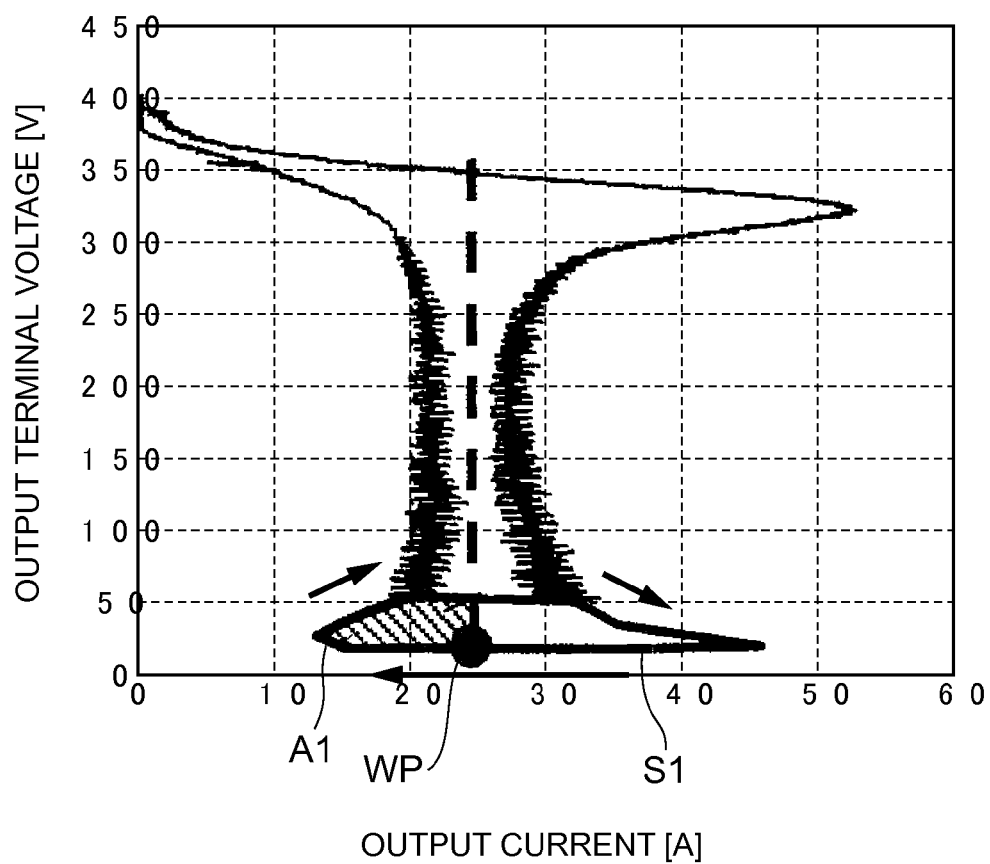
FIG. 3 is a chart indicating one example of the current-voltage characteristics of a fuel cell obtained based on the flowchart shown in FIG. 2.

Subsequently to step S01, in step S02, an effective catalyst area of the fuel cell FC is calculated by means of a current sweep for the fuel cell FC for a short period of time. More specifically, the voltage of the fuel cell FC is varied for a short period of time (not longer than one second), thereby obtaining current-voltage characteristics, which show the relationship between an output terminal voltage and an output current of the fuel cell FC. FIG. 3 shows one example of the obtained current-voltage characteristics. In FIG. 3, WP is an operation point where a rapid warm-up operation is carried out. In FIG. 3, S1 is a curve obtained by varying the output terminal voltage of the fuel cell FC, and this curve S1 is almost the same as the cyclic voltammetry (CV) curve of the unit cell constituting the fuel cell FC.

Figure 4:
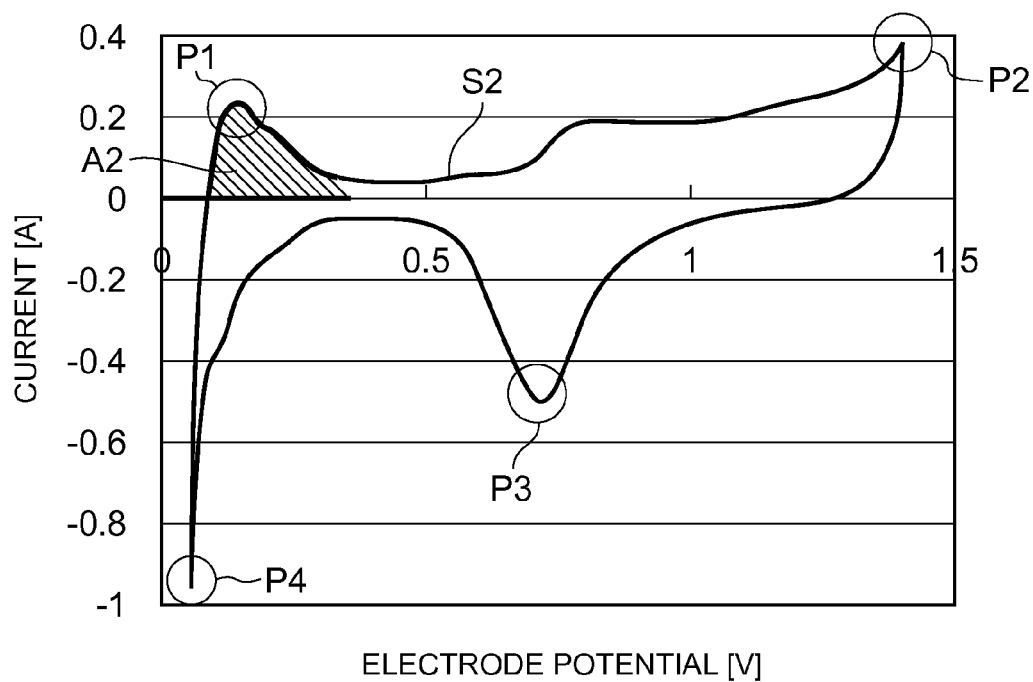
FIG. 4 is a chart showing one example of the CV curve of a unit cell which constitutes a fuel cell.

FIG. 4 shows an example of the above-described CV curve of the unit cell. In P1 in FIG. 4, a hydrogen reaction proceeds, and the reaction of formula (4) below occurs in the anode while the reaction of formula (5) below occurs in the cathode.

$$H_2 \rightarrow 2H^+ + 2e^-$$ (4)

$$2H^+ + 2e^- \rightarrow H_2$$ (5)

In P2, a catalyst oxidation reaction as shown by formula (6) below occurs, and in P3, a catalyst reduction reaction as shown by formula (7) below occurs.

$$2Pt + O_2 \rightarrow 2PtO$$ (6)

$$2PtO \rightarrow 2Pt + O_2$$ (7)

In P4, a hydrogen reaction proceeds, and the reaction of formula (8) below occurs in the anode while the reaction of formula (9) below occurs in the cathode.

$$2H^+ + 2e^{31} \rightarrow H_2$$ (8)

$$H_2 \rightarrow 2H^+ + 2e^-$$ (9)

Accordingly, in the CV curve in FIG. 4, the effective surface area of the catalyst of platinum is obtained by calculating an area of oxidation current which corresponds to about 0.1-0.3 V (area of the region A2) and dividing the obtained area of oxidation current by an electric quantity arising from hydrogen elimination from the catalyst at about 0.1-0.3 V. In other words, the magnitude of the area of the region A2 in FIG. 4 is indicative of the magnitude of the effective catalyst area.

As already stated above, since the curve S1 in FIG. 3, which is a current-voltage curve obtained through a current sweep for the fuel cell FC for a short period of time, is almost the same as the CV curve S2 of the unit cell constituting the fuel cell FC, the region A1 in FIG. 3 corresponds to the region A2 in FIG. 4 and the magnitude of the area of the region A1 is indicative of the magnitude of the effective catalyst area. According to the above, the effective catalyst area of the fuel cell FC is obtained.

Subsequently to step S02, in step S03, whether the fuel cell FC temperature detected in step S01 is below 0° C. and the effective catalyst area calculated in step S02 is below a predetermined value is judged. If the fuel cell FC is at a temperature below 0° C. and if the effective catalyst area is below the predetermined value, the procedure goes to step S04; and if the fuel cell FC is at a temperature equal to or higher than 0° C. and if the effective catalyst area is equal to or greater than the predetermined value, the procedure goes to step S05.

In step S04, the rapid warm-up operation of the fuel cell FC is continued. This is because the fuel cell FC temperature is below 0° C. and the effective catalyst area is below the predetermined value, which means that the gas flow path of the fuel cell FC is clogged, and thus, the fuel cell FC is not prepared to perform normal power generation.

In step S05, the rapid warm-up operation of the fuel cell FC is stopped. This is because the fuel cell FC temperature is equal to or higher than 0° C. and the effective catalyst area is equal to or greater than the predetermined value, which means that no clogging occurs in the gas flow path of the fuel cell FC, and thus, the fuel gas flows through each unit cell constituting the fuel cell FC, and the fuel cell FC is prepared to perform normal power generation.

Figure 5:
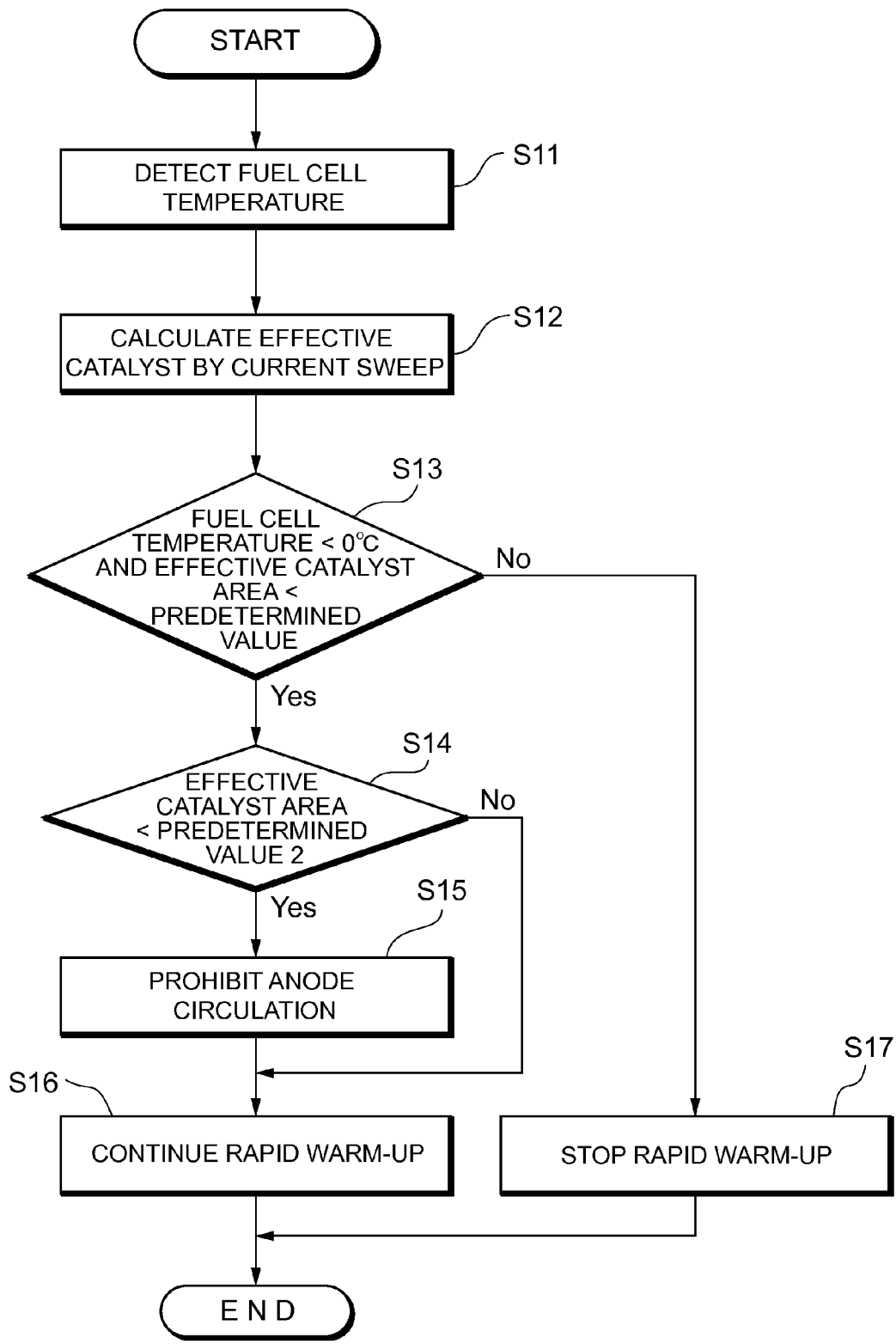
FIG. 5 is a flowchart for determining whether the circulation in a fuel gas supply system is allowed or not in the fuel cell system shown in FIG. 1.
Figure 6:
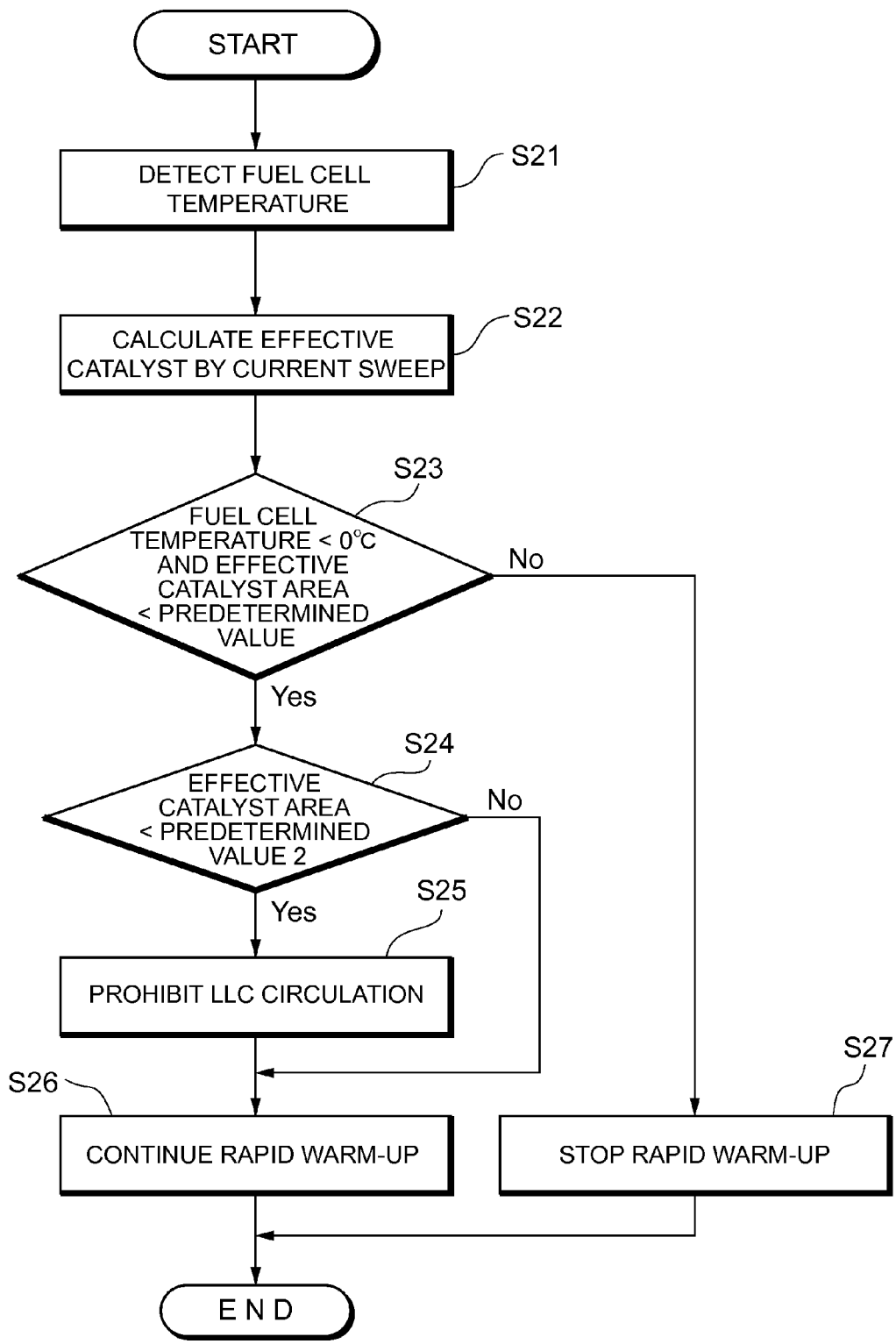
FIG. 6 is a flowchart for determining whether the circulation in a cooling system is allowed or not in the fuel cell system shown in FIG. 1.

The above determination method of this embodiment can also be utilized in determining whether the circulation in the fuel gas supply system FSS is allowed or not, or in determining whether the circulation in the cooling system CS is allowed or not. FIG. 5 is a flowchart showing an application of the above method to the determination of whether the circulation in the fuel gas supply system FSS is allowed or not, and FIG. 6 is a flowchart showing an application of the above method to the determination of whether the circulation in the cooling system CS is allowed or not.

Referring to FIG. 5, the procedure for determining whether the circulation in the fuel gas supply system FSS is allowed or not will be described. In step S11, the temperature of the fuel cell FC is detected. This detection of the fuel cell FC temperature is carried out by a temperature sensor (not shown in the drawing) provided in the fuel cell FC, and the detected temperature is output to the controller EC.

Subsequently to step S11, in step S12, an effective catalyst area of the fuel cell FC is calculated by means of a current sweep for the fuel cell FC for a short period of time. The method of calculating the effective catalyst area is the same as described above, so a detailed description will be omitted here.

Subsequently to step S12, in step S13, whether the fuel cell FC temperature detected in step S11 is below 0° C. and the effective catalyst area calculated in step S12 is below a predetermined value is judged. If the fuel cell FC is at a temperature below 0° C. and if the effective catalyst area is below the predetermined value, the procedure goes to step S14; and if the fuel cell FC is at a temperature equal to or higher than 0° C. and if the effective catalyst area is equal to or greater than the predetermined value, the procedure goes to step S17.

In step S14, whether the effective catalyst area calculated in step S12 is below a second predetermined value is determined. The second predetermined value is smaller than the predetermined value used in step S13. If the effective catalyst area is below the second predetermined value, the procedure goes to step S15, and if the effective catalyst area is equal to or greater than the second predetermined value, the procedure goes to step S16.

In step S15, the circulation pump FS5 is stopped so as to prohibit the circulation in the fuel gas supply system FSS, which is an anode circulation system. If the effective catalyst area is below the second predetermined value, it is suggested that clogging in the gas flow path of the fuel cell FC further proceeds, so the circulation pump FS5 is stopped to prohibit the flow of water, thereby preventing still further clogging in the gas flow path. When prohibiting the circulation in the fuel gas supply system FSS, a decrease of hydrogen concentration would be an issue of concern; however, since the fuel cell system is in the rapid warm-up operation for a short period of time, the operation can be performed without critical problems by increasing the pressure of the fuel gas supplied from the fuel gas supply source FS1.

In step S16, the rapid warm-up operation of the fuel cell FC is continued. This is because the fuel cell FC temperature is below 0° C. and the effective catalyst area is below the predetermined value, which means that the gas flow path of the fuel cell FC is clogged, and thus, the fuel cell FC is not prepared to perform normal power generation.

In step S17, the rapid warm-up operation of the fuel cell FC is stopped. This is because the fuel cell FC temperature is equal to or higher than 0° C. and the effective catalyst area is equal to or greater than the predetermined value, which means that no clogging occurs in the gas flow path of the fuel cell FC, and thus, the fuel gas flows through each unit cell constituting the fuel cell FC, and the fuel cell FC is prepared to perform normal power generation.

Referring next to FIG. 6, the procedure for determining whether the circulation in the cooling system CS is allowed or not will be described. In step S21, the temperature of the fuel cell FC is detected. This detection of the fuel cell FC temperature is carried out by a temperature sensor (not shown in the drawing) provided in the fuel cell FC, and the detected temperature is output to the controller EC.

Subsequently to step S21, in step S22, an effective catalyst area of the fuel cell FC is calculated by means of a current sweep for the fuel cell FC for a short period of time. The method of calculating the effective catalyst area is the same as described above, so a detailed description will be omitted here.

Subsequently to step S22, in step S23, whether the fuel cell FC temperature detected in step S21 is below 0° C. and the effective catalyst area calculated in step S22 is below a predetermined value is judged. If the fuel cell FC is at a temperature below 0° C. and if the effective catalyst area is below the predetermined value, the procedure goes to step S24; and if the fuel cell FC is at a temperature equal to or higher than 0° C. and if the effective catalyst area is equal to or greater than the predetermined value, the procedure goes to step S27.

In step S24, whether the effective catalyst area calculated in step S22 is below a second predetermined value is determined. The second predetermined value is smaller than the predetermined value used in step S23. If the effective catalyst area is below the second predetermined value, the procedure goes to step S25, and if the effective catalyst area is equal to or greater than the second predetermined value, the procedure goes to step S26.

In step S25, the coolant pump CS2 is stopped so as to prohibit the circulation in the cooling system CS. If the effective catalyst area is below the second predetermined value, it is suggested that clogging in the gas flow path of the fuel cell FC further proceeds, so the coolant pump CS2 is stopped so as to reduce a heat capacity, thereby giving priority to the warm-up. When prohibiting the circulation in the cooling system CS, a local increase of temperature would be an issue of concern; however, since it is considered that the reaction in the catalyst does not proceed so much in the case where the effective catalyst area is below the second predetermined value, it is preferable that priority is given to the warm-up.

In step S26, the rapid warm-up operation of the fuel cell FC is continued. This is because the fuel cell FC temperature is below 0° C. and the effective catalyst area is below the predetermined value, which means that the gas flow path of the fuel cell FC is clogged, and thus, the fuel cell FC is not prepared to perform normal power generation.

In step S27, the rapid warm-up operation of the fuel cell FC is stopped. This is because the fuel cell FC temperature is equal to or higher than 0° C. and the effective catalyst area is equal to or greater than the predetermined value, which means that no clogging occurs in the gas flow path of the fuel cell FC, and thus, the fuel gas flows through each unit cell constituting the fuel cell FC, and the fuel cell FC is prepared to perform normal power generation.

DESCRIPTION OF REFERENCE NUMERALS

FCS: fuel cell system
FC: fuel cell
ASS: oxidant gas supply system
AS1: filter
AS2: air compressor
AS3: oxidant gas flow path
AS4: oxidant-off gas flow path
AS5: humidifier
A3: back pressure regulating valve
CS: cooling system
CS1: radiator
CS2: coolant pump
CS3: coolant inflow path
CS4: coolant outflow path
FSS: fuel gas supply system
FS1: fuel gas supply source
FS2: injector
FS3: fuel gas flow path FS4: circulation flow path
FS5: circulation pump
FS6: exhaust/drain flow path
H1: cutoff valve
H2: regulator
H3: cutoff valve
H4: cutoff valve
H5: exhaust/drain valve
ES: electric power system
ES1: DC/DC converter
ES2: battery
ES3: traction inverter
ES4: traction motor
ES5: auxiliary devices
EC: controller
S1: voltage sensor
S2: current sensor
S3: SOC sensor
S4: pressure sensor
S5: water temperature sensor
ACC: acceleration-opening-degree signal
IG: ignition signal
VC: vehicle speed signal

The invention claimed is:

1. A fuel cell system that performs a warm-up operation by reducing an amount of oxidant gas supplied to a fuel cell, the system comprising:

a fuel cell; and a control unit that regulates amounts of oxidant gas and fuel gas supplied to the fuel cell and controls a power-generation state of the fuel cell, wherein, during the warm-up operation with a reduced supply of oxidant gas to the fuel cell, the control unit varies a voltage of the fuel cell for a short period of time to obtain current-voltage characteristics which indicate a relationship of an output voltage and an output current of the fuel cell, and wherein the control unit calculates an effective catalyst area of the fuel cell based on the obtained current-voltage characteristics and determines whether the warm-up operation of the fuel cell can be stopped or not based on the calculated effective catalyst area.

2. The fuel cell system according to claim 1, wherein the control unit determines, based on the calculated effective catalyst area, whether circulation in an anode circulation system is allowed or not, the anode circulation system being a system for supplying fuel gas to the fuel cell in a circulating manner.

3. The fuel cell system according to claim 1, wherein the control unit determines, based on the calculated effective catalyst area, whether circulation in a cooling system for the fuel cell is allowed or not.

* * * * *